United States Patent
Saigo et al.

(10) Patent No.: US 10,057,555 B2
(45) Date of Patent: Aug. 21, 2018

(54) IMAGE PROCESSING DEVICE, DISPLAY DEVICE, AND METHOD OF CONTROLLING IMAGE PROCESSING DEVICE

(71) Applicant: Seiko Epson Corporation, Tokyo (JP)

(72) Inventors: Manabu Saigo, Matsumoto (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 15/053,388

(22) Filed: Feb. 25, 2016

(65) Prior Publication Data

US 2016/0261836 A1 Sep. 8, 2016

(30) Foreign Application Priority Data

Mar. 2, 2015 (JP) ................................. 2015-040652

(51) Int. Cl.
*H04N 9/31* (2006.01)
*G06T 11/00* (2006.01)

(52) U.S. Cl.
CPC .......... *H04N 9/3185* (2013.01); *G06T 11/001* (2013.01)

(58) Field of Classification Search
None
See application file for complete search history.

(56) References Cited

U.S. PATENT DOCUMENTS

2009/0052800 A1* 2/2009 Aso ....................... G06T 3/4007
382/275

FOREIGN PATENT DOCUMENTS

JP 11-331737 A 11/1999
JP 2011-199626 A 10/2011

* cited by examiner

*Primary Examiner* — Mark Zimmerman
*Assistant Examiner* — Nurun N Flora
(74) *Attorney, Agent, or Firm* — ALG Intellectual Property, LLC

(57) ABSTRACT

A projector adapted to deform an input image to generate an output image includes a geometric correction section adapted to perform a geometric correction of the input image, and a background data generation section adapted to output data of a post-correction image as data of the output image in the case in which the data of the post-correction image obtained by performing the geometric correction on the input image is input from the geometric correction section, and to output data of a background image to be a background of the post-correction image as the data of the output image in the case in which the data of the post-correction image is not input from the geometric correction section.

4 Claims, 12 Drawing Sheets

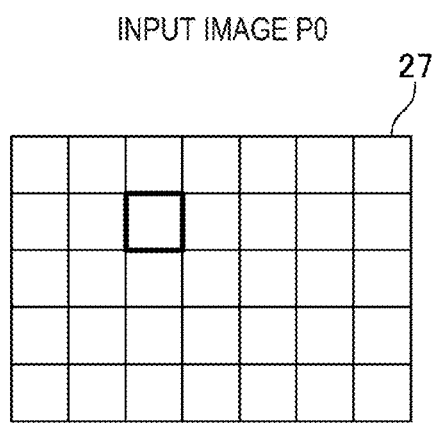
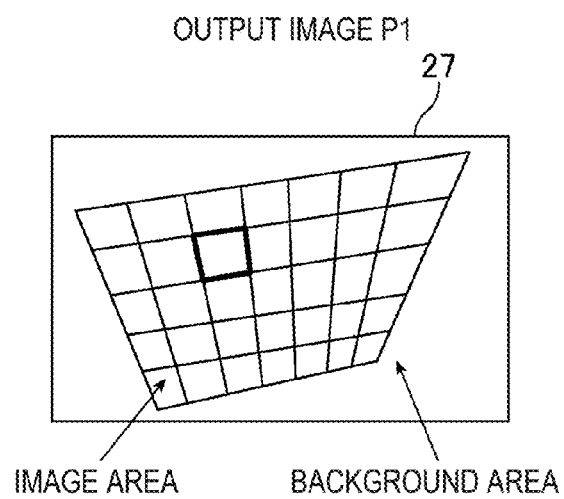
FIG. 3A
FIG. 3B

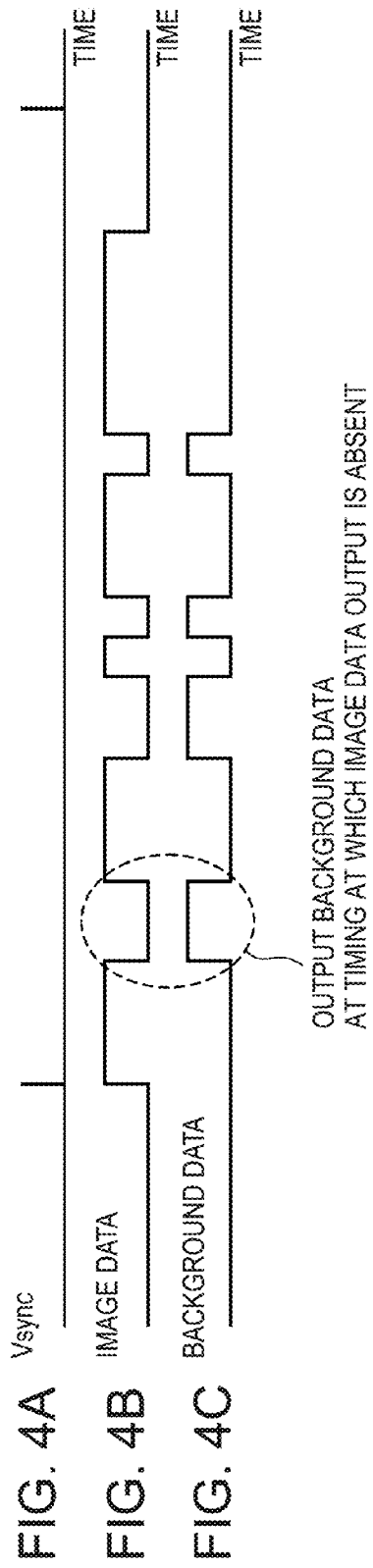

FILLED WITH BACKGROUND DATA

OVERWRITTEN WITH IMAGE DATA

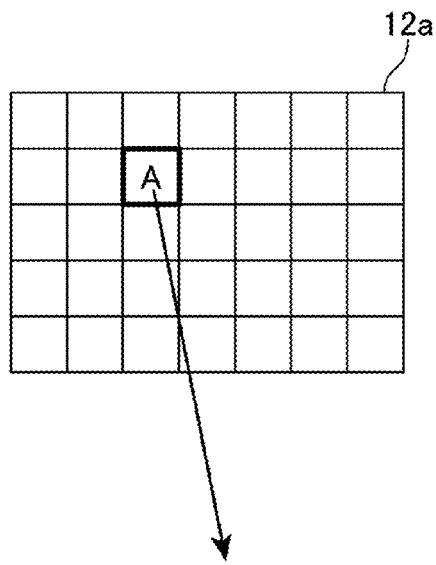
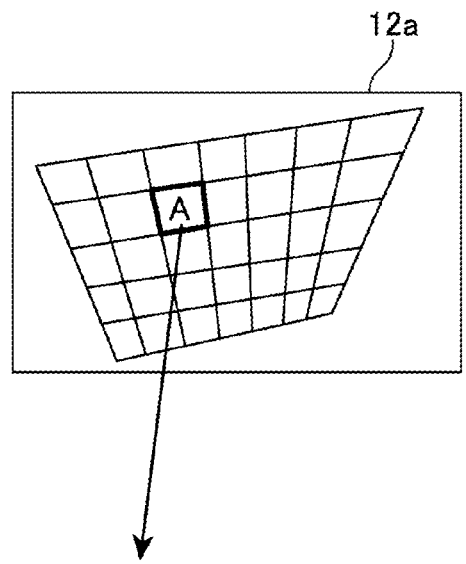
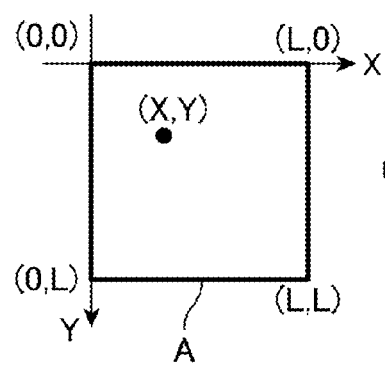
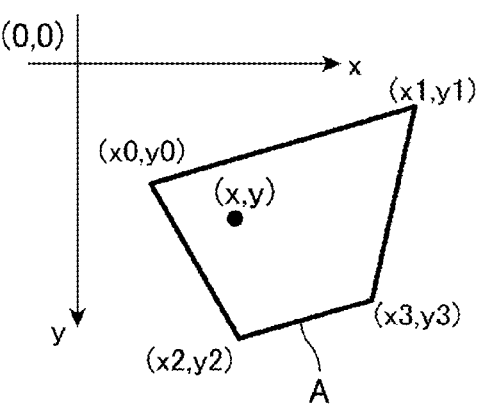
FIG.11A FIG.11B

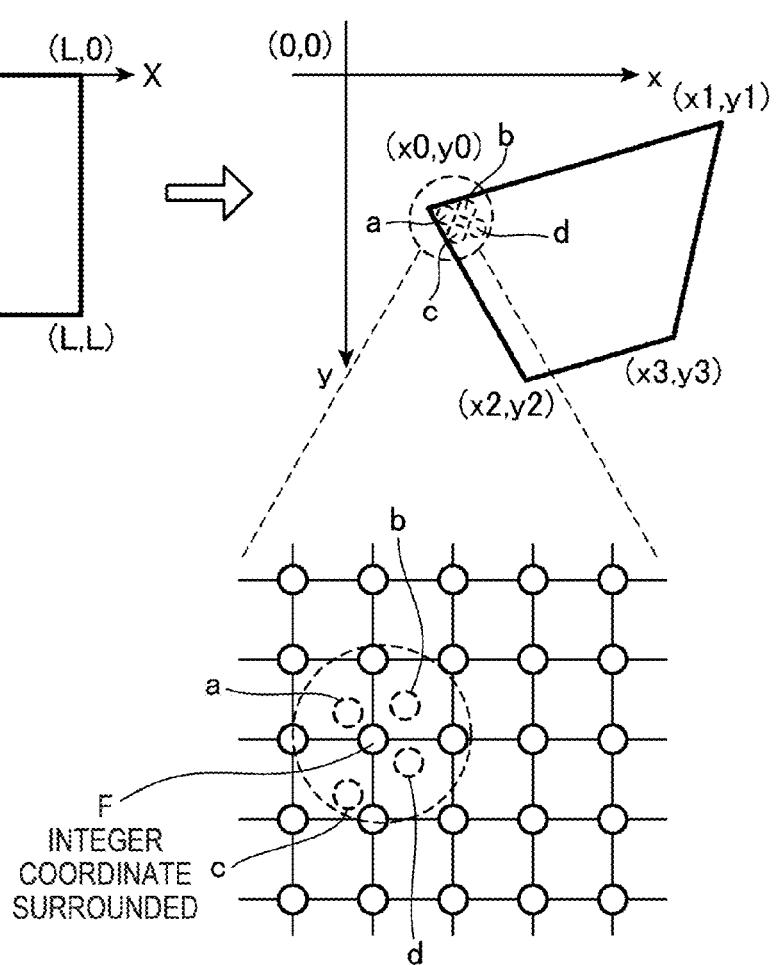

POST-CORRECTION IMAGE P3

PRE-CORRECTION IMAGE P2

IMAGE PROCESSING DEVICE, DISPLAY DEVICE, AND METHOD OF CONTROLLING IMAGE PROCESSING DEVICE

The entire disclosure of Japanese Patent Application No.2015-040652, filed Mar. 2, 2015 is expressly incorporated by reference herein.

BACKGROUND

1. Technical Field

The present invention relates to an image processing device, a display device, and a method of controlling an image processing device.

2. Related Art

There has been known a device for performing a geometric correction of deforming the shape of an image to be displayed on a display section (see, e.g., JP-A-11-331737). JP-A-11-331737 discloses a projector for performing a keystone distortion correction as a typical example of a geometric correction.

In general, since the correction of deforming the shape of the image is accompanied by a contraction deformation of the input image, the image having been corrected is provided with a region caused by the contraction deformation generated in the peripheral part of the display image. For example, since the keystone distortion correction is performed by forming the image contracted to have a trapezoidal shape on the liquid crystal panel provided to the image processing device, in the case in which the keystone distortion of the display image is significant, the image formed on the liquid crystal panel becomes small. If an appropriate image fails to be displayed in the region of the liquid crystal panel where the display image is not displayed, the display image quality of the display image is degraded in some cases.

SUMMARY

An advantage of some aspects of the invention is to provide an image processing device, a display device, and a method of controlling an image processing device each capable of suppressing the degradation of the display image quality of the image due to the deformation of the image.

An image processing device according to an aspect of the invention is an image processing device adapted to deform an input image to generate an output image, the image processing device including an image deformation section adapted to perform deformation of the input image, and an output image generation section adapted to output data of a post-deformation image obtained by deforming the input image as data of the output image in a case in which the data of the post-deformation image is input from the image deformation section, and to output data of a background image to be a background of the post-deformation image as the data of the output image in a case in which the data of the post-deformation image is not input from the image deformation section.

According to this aspect of the invention, the degradation of the display image quality of the image due to the deformation of the image can be suppressed.

The image processing device described above may further include a position information generation section adapted to generate position information representing a pixel position of the output image where the data of the post-deformation image is not output from the image deformation section, and the output image generation section may determine a timing at which the data of the post-deformation image is not input from the image deformation section based on the position information, and output the data of the background image at the timing at which the data of the post-deformation image is not input.

According to the aspect of the invention with this configuration, it is possible to accurately determine the timing at which the data of the post-deformation image is not input from the image deformation section to output the data of the background image as the output image.

In the image processing device described above, the position information generation section may generate background information representing the background of the post-deformation image as the position information based on the data of the post-deformation image input from the image deformation section when the image deformation section deforms one frame of the input image.

According to the aspect of the invention with this configuration, the position information can be generated with a simple process.

A display device according to another aspect of the invention is a display device adapted to deform an input image to display on a display section, the display device including an image deformation section adapted to perform deformation of the input image, an output image generation section adapted to output data of a post-deformation image obtained by deforming the input image as data of the output image in a case in which the data of the post-deformation image is input from the image deformation section, and to output data of a background image to be a background of the post-deformation image as the data of the output image in a case in which the data of the post-deformation image is not input from the image deformation section, and an image processing section adapted to form an output image based on the data of the output image input from the output image generation section to display on the display section.

According to this aspect of the invention, the degradation of the display image quality of the image due to the deformation of the image can be suppressed.

A method of controlling an image processing device according to another aspect of the invention is a method of controlling an image processing device adapted to deform an input image to generate an output image, the method including performing deformation of the input image, and outputting data of a post-deformation image obtained by deforming the input image as data of the output image in a case in which the data of the post-deformation image is input, and outputting data of a background image to be a background of the post-deformation image as the data of the output image in a case in which the data of the post-deformation image is not input.

According to this aspect of the invention, the degradation of the display image quality of the image due to the deformation of the image can be suppressed.

BRIEF DESCRIPTION OF THE DRAWINGS

The invention will be described with reference to the accompanying drawings, wherein like numbers reference like elements.

FIGS. 3A and 3B are explanatory diagrams of a keystone distortion correction, wherein FIG. 3A is a diagram showing an input image, and FIG. 3B is a diagram showing an output image.

FIGS. 4A through 4C are diagrams showing operation timing of a background data generation section, wherein FIG. 4A is a diagram showing an output vertical sync signal, FIG. 4B is a diagram showing image data to be output from the background data generation section, and FIG. 4C is a diagram showing background data to be output from the background data generation section.

FIGS. 7A and 7B are diagrams showing a comparative example, wherein FIG. 7A is a diagram showing the state in which the entire area of the frame memory is filled with background data, and FIG. 7B is a diagram showing the state of overwriting an image area with image data.

FIGS. 9A and 9B are explanatory diagrams of a calculation method of coordinate conversion information, wherein FIG. 9A is a diagram showing a pre-correction image, and FIG. 9B is a diagram showing a post-correction image.

FIGS. 11A and 11B are explanatory diagrams of a geometric correction process, wherein FIG. 11A is an enlarged view of a block A, which is one of blocks constituting the pre-correction image, and FIG. 11B is an enlarged view of the block A in the post-correction image.

FIGS. 12A and 12B are explanatory diagrams of the geometric correction process, wherein FIG. 12A is a diagram showing four pixels selected in the block A, and FIG. 12B is a diagram showing pixel positions of the selected four pixels on which the geometric correction has been performed.

FIGS. 13A and 13B are explanatory diagrams of the geometric correction process, wherein FIG. 13A is a diagram showing an output pixel surrounded by the four pixels on the post-correction image, and FIG. 13B is a diagram showing the state in which the four pixels and an output pixel are restored to the state in which the correction has not been performed.

DESCRIPTION OF EXEMPLARY EMBODIMENTS

First Embodiment

Figure 1:
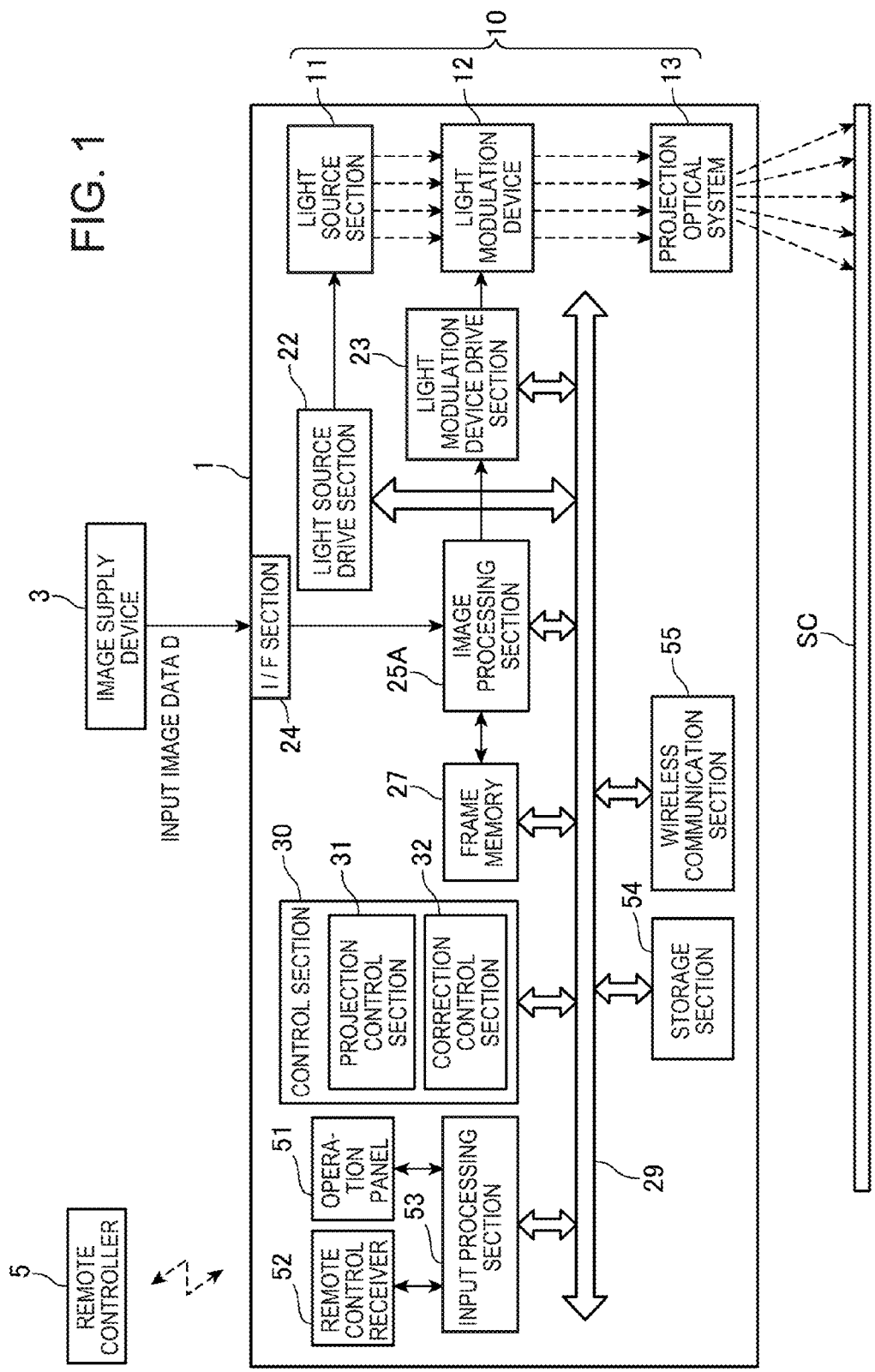
FIG. 1 is a block diagram of a projector according to a first embodiment.

FIG. 1 is a block diagram of a projector 1 according to a first embodiment.

The projector 1 as a display device is a device connected to an image supply device 3 located in the outside such as a personal computer or a variety of types of video players, and for projecting an image, which is based on input image data D input from the image supply device 3, on a target object. As such an image supply device 3, there can be cited a video output device such as a video reproduction device, a DVD (digital versatile disk) reproduction device, a television tuner device, a set-top box for a CATV (cable television), or a video game device, a personal computer, and so on. Further, the target object can also be an object, which is not evenly flat, such as a building or a body, or can also be an object having a flat projection surface such as a screen SC or a wall surface of a building. In the present embodiment, the case in which the projection is performed on a flat screen SC will be illustrated.

The projector 1 is provided with an I/F (interface) section 24 as an interface to be connected to the image supply device 3. As the I/F section 24, there can be used, for example, a DVI interface, a USB interface, and a LAN interface to which a digital video signal is input. Further, as the I/F section 24, there can be used, for example, an S-video terminal to which a composite video signal such as NTSC, PAL, or SECAM is input, an RCA terminal to which a composite video signal is input, or a D terminal to which a component video signal is input. Further, as the I/F section 24, there can be used a multipurpose interface such as an HDMI connector compliant to the HDMI (registered trademark) standard. Further, it is also possible to adopt a configuration in which the I/F section 24 has an A/D conversion circuit for converting an analog video signal into digital image data, and is connected to the image supply device 3 with an analog video terminal such as a VGA terminal. It should be noted that it is also possible for the I/F section 24 to perform transmission/reception of the image signal using wired communication, or to perform transmission/reception of the image signal using wireless communication.

The projector 1 is provided with a display section 10 for performing optical image formation, and an image processing system for electrically processing the image to be displayed by the display section 10 in a general classification. Firstly, the display section 10 will be described.

The display section 10 is provided with a light source section 11, a light modulation device 12, and a projection optical system 13.

The light source section 11 is provided with a light source formed of a xenon lamp, a super-high pressure mercury lamp, a light emitting diode (LED), or the like. Further, the light source section 11 can also be provided with a reflector and an auxiliary reflector for guiding the light emitted by the light source to the light modulation device 12. Further, the light source section 11 can be a device provided with a lens group for enhancing the optical characteristics of the projection light, a polarization plate, a dimming element for reducing the light intensity of the light emitted by the light source on a path leading to the light modulation device 12, and so on (all not shown).

The light modulation device 12 corresponds to a modulation section for modulating the light emitted from the light source section 11 based on the image data. The light modulation device 12 has a configuration using a liquid crystal panel. The light modulation device 12 is provided with a transmissive liquid crystal panel having a plurality of pixels arranged in a matrix, and modulates the light emitted by the light source. The light modulation device 12 is driven by a light modulation device drive section 23, and varies the light transmittance in each of the pixels arranged in a matrix to thereby form the image.

The projection optical system 13 is provided with a zoom lens for performing expansion/contraction of the image to be projected and an adjustment of the focus, a focus adjustment mechanism for performing an adjustment of the focus, and so on. The projection optical system 13 projects the image light, which has been modulated by the light modulation device 12, on the target object to form the image.

To the display section 10, there are connected a light source drive section 22 and the light modulation device drive section 23.

The light source drive section 22 drives the light source provided to the light source section 11 in accordance with the control by the control section 30. The light modulation device drive section 23 drives the light modulation device 12 in accordance with the image signal input from an image processing section 25A described later in accordance with the control by the control section 30 to draw the image on the liquid crystal panel.

The image processing system of the projector 1 is configured with the control section 30 for controlling the projector 1 as a main constituent. The projector 1 is provided with a storage section 54 storing data to be processed by the control section 30 and a control program executed by the control section 30. Further, the projector 1 is provided with a remote control receiver 52 for detecting an operation by a remote controller 5, and is further provided with an input processing section 53 for detecting an operation via an operation panel 51 or the remote control receiver 52.

The storage section 54 is a nonvolatile memory such as a flash memory or an EEPROM.

The control section 30 is configured including a central processing unit (CPU), a read only memory (ROM), a random access memory (RAM), and so on not shown. The control section 30 controls the projector 1 by the CPU executing a basic control program stored in the ROM and the control program stored in the storage section 54. Further, the control section 30 executes the control program stored in the storage section 54 to thereby achieve the functions of a projection control section 31 and a correction control section 32.

The main body of the projector 1 is provided with the operation panel 51 having a variety of switches and indicator lamps for the user to perform the operations. The operation panel 51 is connected to the input processing section 53. The input processing section 53 appropriately lights or blinks the indicator lamps of the operation panel 51 in accordance with the operation state and the setting state of the projector 1 in accordance with the control of the control section 30. When the switch of the operation panel 51 is operated, an operation signal corresponding to the switch having been operated is output from the input processing section 53 to the control section 30.

Further, the projector 1 has the remote controller 5 to be used by the user. The remote controller 5 is provided with a variety of types of buttons, and transmits an infrared signal in accordance with the operation of these buttons. The main body of the projector 1 is provided with the remote control receiver 52 for receiving the infrared signal emitted by the remote controller 5. The remote control receiver 52 decodes the infrared signal received from the remote controller 5 to generate an operation signal representing the operation content in the remote controller 5, and then outputs the operation signal to the control section 30.

The image processing section (an image processing device) 25A obtains input image data D in accordance with the control of the control section 30 to determine an attribute such as the image size, the resolution, whether the image is a still image or a moving image, and the frame rate in the case in which the image is a moving image with respect to the input image data D, and so on. The image processing section 25A develops the image in the frame memory 27 frame by frame, and then performs image processing on the image having been developed. The image processing section 25A reads out the image having been processed from the frame memory 27, generates image signals of R, G, and B corresponding to the image, and then outputs the image signals to the light modulation device drive section 23.

The processes performed by the image processing section 25A are, for example, a resolution conversion process, a digital zoom process, a color correction process, a luminance correction process, and a geometric correction process. Further, the image processing section 25A performs a drawing process for drawing an image in the frame memory 27 based on the image data input from the I/F section 24, a generation process for reading out the image from the frame memory 27 to generate the image signal, and so on. Further, it is obviously possible for the image processing section 25A to perform two or more of the processes described above in combination with each other.

Further, the projector 1 is provided with a wireless communication section 55. The wireless communication section 55 is provided with an antenna, an RF (radio frequency) circuit, and so on not shown, and performs the wireless communication with an external device under the control of the control section 30. As the wireless communication method of the wireless communication section 55, there can be adopted, for example, a near field communication method such as a wireless local area network (LAN), Bluetooth (registered trademark), UWB (ultra wide band), or infrared communication, or a wireless communication method using a mobile telephone line.

The projection control section 31 controls the light source drive section 22, the light modulation device drive section 23, and the image processing section 25A to project the image based on the input image data D on the target object.

The correction control section 32 controls the image processing section 25A to perform the geometric correction process in the case in which, for example, the input processing section 53 detects an instruction of the geometric correction process by the remote controller 5 or the operation panel 51, and the operation data representing the instruction of the geometric correction process has been input.

Figure 2:
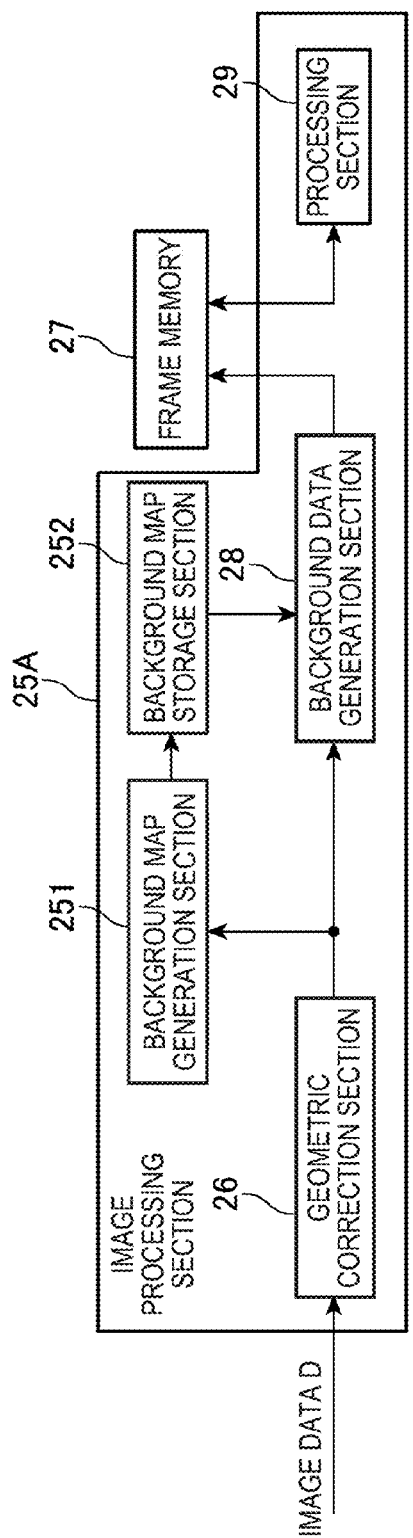
FIG. 2 is a configuration diagram of an image processing section of the first embodiment.

FIG. 2 is a configuration diagram of the image processing section 25A of the first embodiment.

The image processing section 25A is provided with a geometric correction section (an image deformation section) 26, a background map generation section (a position information generation section) 251, a background map storage section 252, a background data generation section (an output image generation section) 28, and a processing section 29.

The geometric correction section 26 obtains the input image data D, and then performs the geometric correction process on the input image data D thus obtained. In the present embodiment, a keystone distortion correction is performed as an example of the geometric correction process. It should be noted that the keystone distortion correction is hereinafter referred to simply as a correction.

In the case in which the projector 1 is disposed having a tilt with respect to the screen SC, even if the image to be written to the frame memory 27 has a rectangular shape, the image to be projected on the screen SC becomes a distorted image. The geometric correction section 26 deforms the image (hereinafter referred to as an input image) based on the input image data D so as to compensate the keystone distortion on the screen SC in order to make the image provided with the keystone distortion seem like an image having a shape with which the image is originally displayed.

FIGS. 3A and 3B are explanatory diagrams of the correction, wherein FIG. 3A shows an input image P0 drawn in the frame memory 27, and FIG. 3B shows an output image P1 drawn in the frame memory 27. The output image P1 is an image to be written to the frame memory 27 after the correction by the geometric correction section 26. When projecting the output image P1 on the screen SC, the keystone distortion is canceled out, and the image is displayed with a rectangular shape.

The image data (the data of the post-correction image) output by the geometric correction section 26 after performing the geometric correction on the input image P0 is the image data in an area (hereinafter referred to as an image area) shown in FIG. 3B in which the image obtained by performing the geometric correction on the input image P0 is drawn. The data of an area (hereinafter referred to as a background area) other than the image area is not output from the geometric correction section 26. In the projector 1 and a transmissive liquid crystal display device, if background data (the data of a background image) such as a black image is not disposed in the background area, the peripheral area unrelated to the projection image to be projected on the screen SC becomes unnaturally bright, which becomes a factor for the degradation of the display image quality of the projection image.

Therefore, in the present embodiment, the background data generation section 28 determines the timing, at which the image data is not output from the geometric correction section 26, to write the background data to the frame memory 27 at the timing at which the image data is not output.

The background map generation section 251 generates a background map (background information) representing the background area based on the image data input from the geometric correction section 26 when the geometric correction section 26 performs the geometric correction on one frame of the input image P0. The background map is a map for distinguishing between the image area described above and the background area from each other, and is a map storing the data of "0" or "1" in accordance with each of the pixels of the output image P1. The background map generation section 251 stores "0" at the corresponding pixel position in the output image P1 in the case in which the image data is input from the geometric correction section 26, and stores "1" at the corresponding pixel position of the output pixel in the case in which the image data is not input from the geometric correction section 26. The background map generation section 251 outputs the background map thus generated to the background map storage section 252 to store the background map in the background map storage section 252.

The processing section 29 reads out the data (the image data and the background data) having been stored in the frame memory 27, and then performs at least either one of resolution conversion, digital zoom, a color correction, and a luminance correction on the data thus read out.

FIGS. 4A through 4C are diagrams showing the operation timing of the background data generation section 28. FIG. 4A shows an output vertical sync signal (hereinafter described as Vsync) to be supplied from the control section 30 to the background data generation section 28, and FIG. 4B shows an output timing at which the background data generation section 28 outputs the image data. Further, FIG. 4C is a diagram showing an output timing at which the background data generation section 28 outputs the background data.

The background data generation section 28 writes the image data or the background data to the frame memory 27 as the data forming the output image P1 in sync with an output horizontal sync signal (hereinafter described as Lsyn; not shown) input from the control section 30 and the output vertical sync signal Vsync.

The background data generation section 28 determines the timing at which the image data is not input from the geometric correction section 26 based on the background map stored in the background map storage section 252 and the signals Lsyn and Vsync. The background data generation section 28 writes the background data to the frame memory 27 as the data forming the output image P1 at the timing at which the image data is not input from the geometric correction section 26. In the example shown in FIGS. 4A through 4C, the signal level of the background data shown in FIG. 4C turns to the high level at the timing at which the signal level of the image data shown in FIG. 4B drops to the low level, and the background data from the background data generation section 28 is written to the frame memory 27. As the background data, image data with a black background color, for example, can be used. Further, the background color is not limited to black, but any color with low pixel value can also be adopted.

Figure 5:
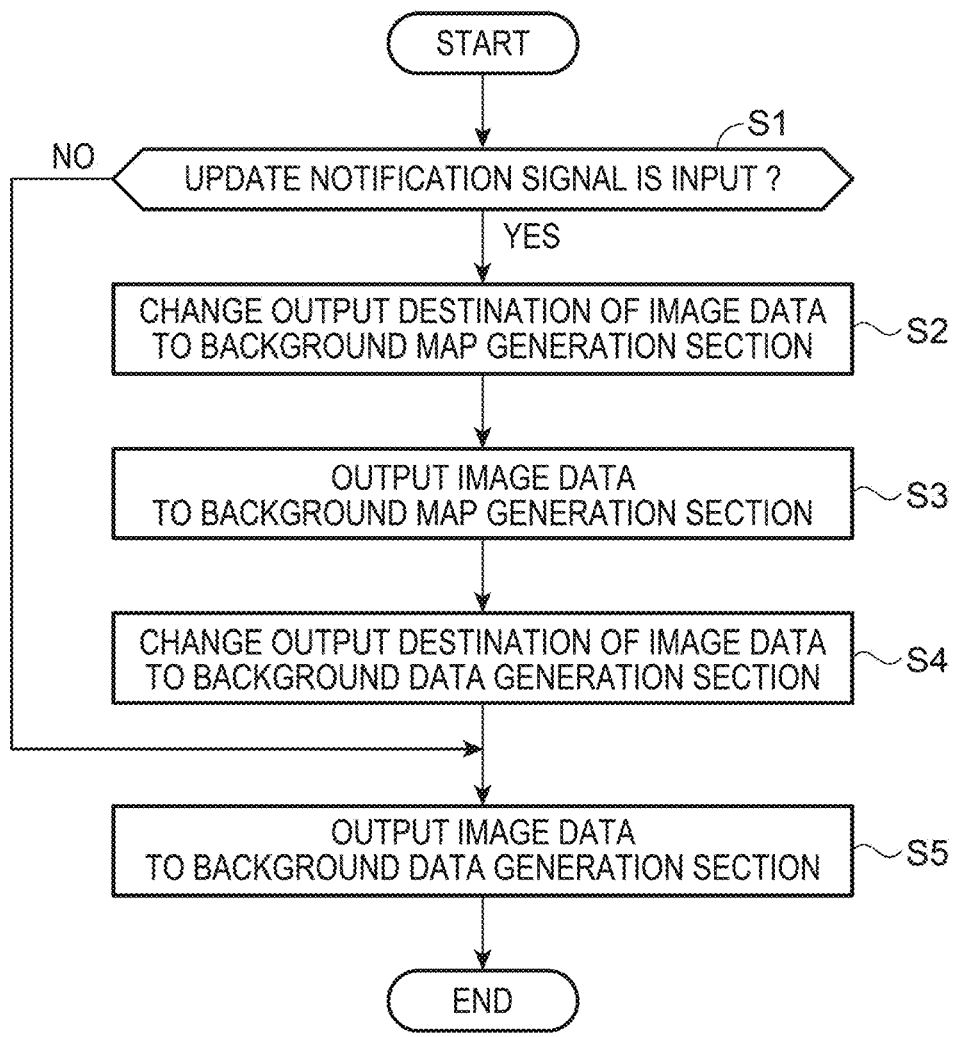
FIG. 5 is a flowchart showing a processing procedure of a geometric correction section of the first embodiment.

FIG. 5 is a flowchart showing a processing procedure of the geometric correction section 26.

The control section 30 updates the transmission destination coordinate table, and then transmits the signal (hereinafter referred to as an update notification signal) representing the fact that the transmission destination coordinate table has been updated to the geometric correction section 26. The transmission destination coordinate table is a table having the position (the coordinate) of the pixel in the output image P1 and the position (the coordinate) on the input image P0 corresponding to the position associated with each other. It should be noted that it is not required for the transmission destination coordinate table to include the correspondence relationship with respect to all of the pixels in the output image P1.

When the update notification signal is input from the control section 30 (YES in the step S1), the geometric correction section 26 changes (step S2) the output destination of the image data, on which the correction has been performed, from the background data generation section 28 to the background map generation section 251. After inputting the update notification signal, the geometric correction section 26 corrects the image data of one frame input for the first time, and then outputs (step S3) the image data having been processed to the background map generation section 251. When the correction to the image data of the first one frame is completed, the geometric correction section 26 changes (step S4) the output destination of the image data to the background data generation section 28. Subsequently, the geometric correction section 26 corrects the image data input to the geometric correction section 26, and then outputs (step S5) the result to the background data generation section 28. Further, the geometric correction section 26 determines in the step S1 that the update notification signal has not been input (NO in the step S1), the geometric correction section 26 outputs (step S5) the image data having been corrected to the background data generation section 28 without changing the output destination of the image data.

Figure 6:
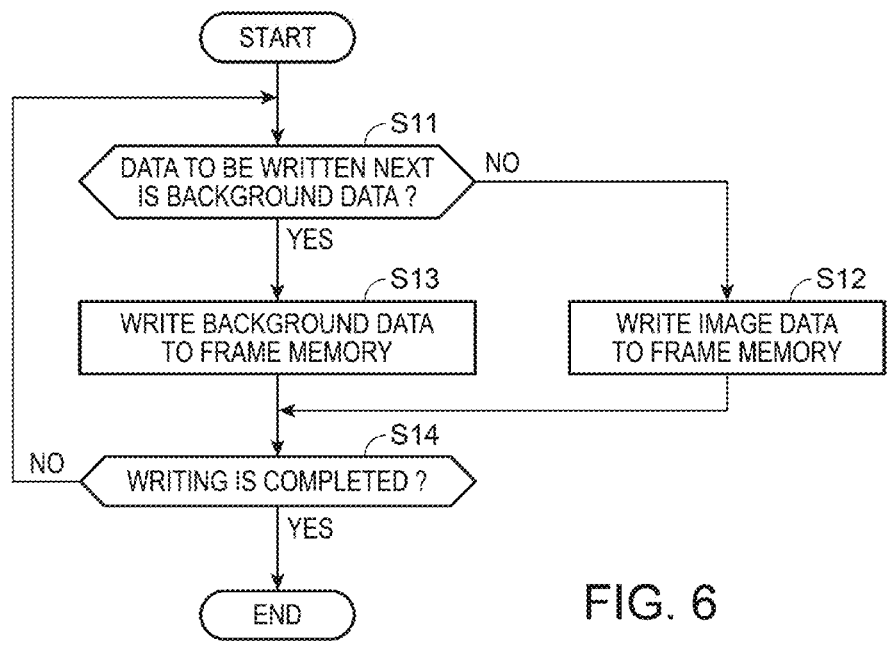
FIG. 6 is a flowchart showing a processing procedure of the background data generation section.

FIG. 6 is a flowchart showing a processing procedure of the background data generation section 28.

The background data generation section 28 writes the image data input from the geometric correction section 26 or the background data to the frame memory 27 in sync with the signals Lsyn and Vsync input from the control section 30.

The background data generation section 28 looks up the background map stored in the background map storage section 252 to determine (step S11) whether or not the data subsequently written to the frame memory 27 is the background data. When the background data generation section 28 determines that the data to be subsequently written is the background data (YES in the step S11), the background data generation section 28 writes (step S13) the background data to the frame memory 27 as the data for forming the output image P1. Further, when the background data generation section 28 determines that the data to be subsequently written is not the background data (NO in the step S11), the background data generation section 28 writes (step S12) the image data, which is input from the geometric correction section 26, to the frame memory 27 as the data for forming the output image P1. When the process of the step S12 or the step S13 is completed, the background data generation section 28 looks up the background map to determine (step S14) whether or not writing to the frame memory 27 has been completed. In the case in which it is determined that writing is not completed (NO in the step S14), the background data generation section 28 returns to the step S11. Further, in the case in which it is determined that writing is completed (YES in the step S14), the background data generation section 28 terminates the processing flow.

Figure 7A:
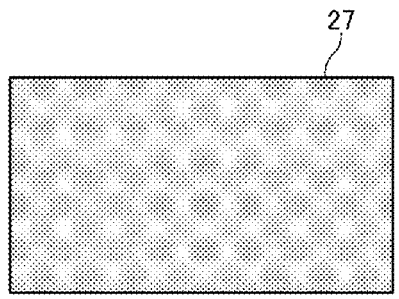
Figure 7B:
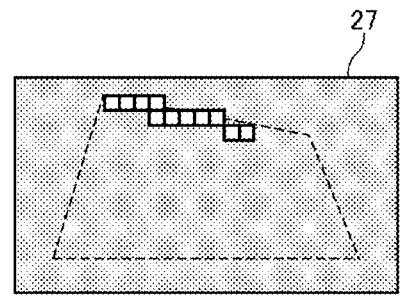

FIGS. 7A and 7B are diagrams showing a comparative example to the present embodiment, wherein FIG. 7A is a diagram showing the state in which the entire area of the frame memory 27 is filled with background data, and FIG. 7B is a diagram showing the state of overwriting the image area with the image data.

In the case in which the entire area of the frame memory 27 is filled with the background data as shown in FIG. 7A, and then the image area is overwritten with the image data as shown in FIG. 7B, data writing is performed twice, namely the image data and the background data, in the image area. In other words, unnecessary data occurs in the data to be written to the frame memory 27.

In contrast, in the present embodiment, the background data generation section 28 determines the timing, at which the image data is not output from the geometric correction section 26, based on the background map, and at the timing at which the image data is not output, the background data generation section 28 outputs and writes the background data to the frame memory 27. Therefore, there is no chance for the image data to be written twice to the image area, and the output image P1 can be written to the frame memory 27 in the data writing time for one frame.

Second Embodiment

Figure 8:
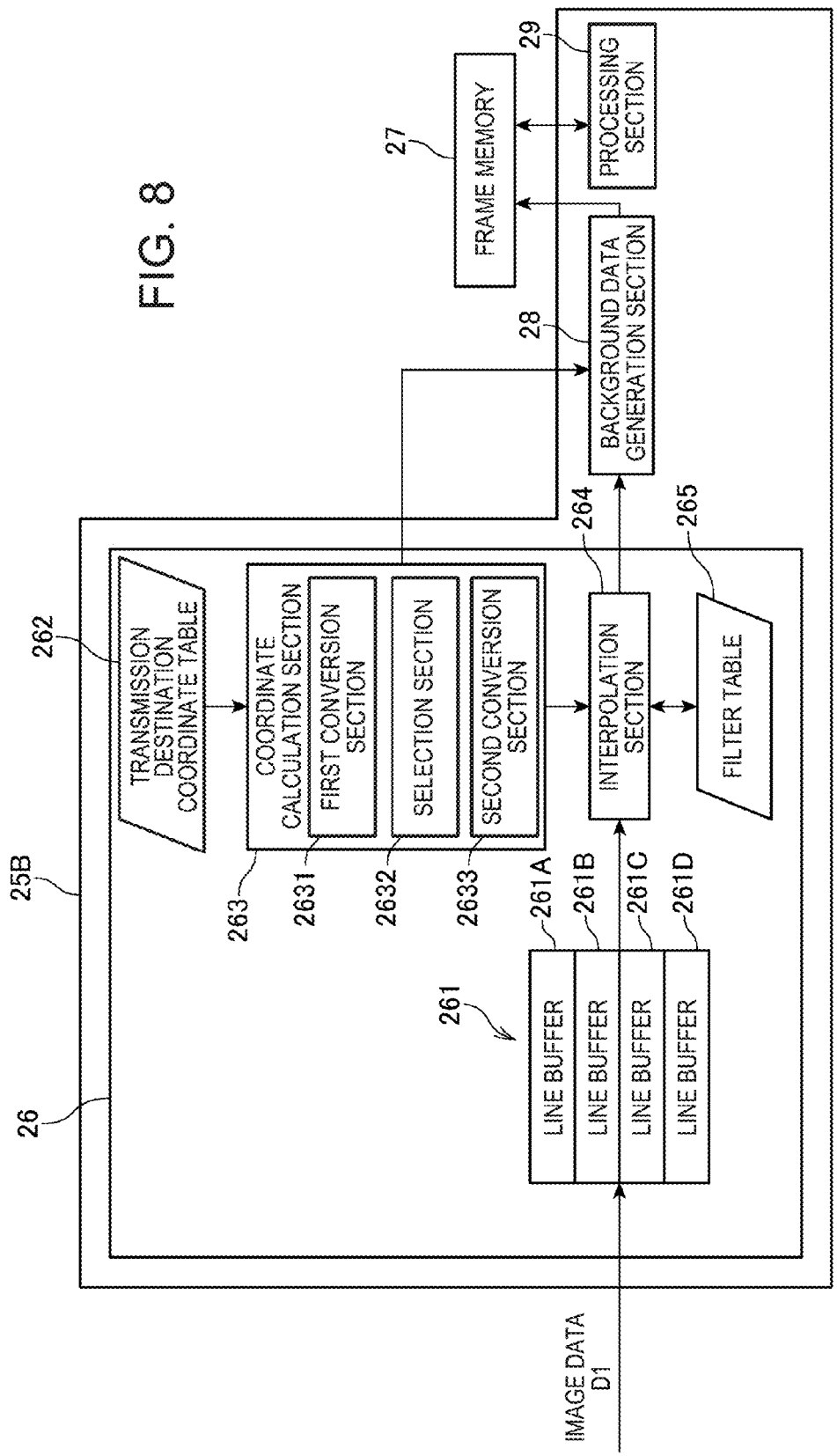
FIG. 8 is a configuration diagram of an image processing section of a second embodiment.

FIG. 8 is a configuration diagram of an image processing section (an image processing device) 25B of the second embodiment. The image processing section 25B is provided with the geometric correction section 26 and the processing section 29.

The geometric correction section 26 performs the geometric correction process on the input image data D to store the image data having been corrected to the frame memory 27. The processing section 29 reads out the image having been processed by the geometric correction section 26 from the frame memory 27, and then performs at least either one of resolution conversion, digital zoom, a color correction, and a luminance correction on the image.

The geometric correction section 26 is provided with line buffers 261, a transmission destination coordinate table 262, a coordinate calculation section (a position information generation section) 263, an interpolation section 264, and a filter table 265. Further, the coordinate calculation section 263 is provided with a first conversion section 2631, a selection section 2632, and a second conversion section 2633.

The line buffers 261 include a line buffer 261A, a line buffer 261B, a line buffer 261C, and a line buffer 261D. Each of the line buffers 261A, 261B, 261C, and 261D stores image data corresponding to one line in the horizontal direction. In other words, the line buffers 261 of the present embodiment store the image data corresponding to four lines in the horizontal direction. Hereinafter, the image data, which is input from the I/F section 24, stored in the line buffers 261, and corresponds to a plurality of lines in the horizontal direction, is described as image data D1.

The pixel data of each of the pixels constituting the image data D1 is included in the image data D1 stored by the line buffers 261. The pixel data includes pixel position information representing the pixel position in the image data of one frame, and a pixel value of each of the pixels.

Although FIG. 8 shows the line buffers 261 including the four line buffers 261A, 261B, 261C, and 261D, the number of line buffers is not limited to four, but can be increased and decreased in accordance with the number of pixels necessary for the interpolation process of the interpolation section 264.

The coordinate conversion information is registered in the transmission destination coordinate table 262. The coordinate conversion information is information obtained by calculating coordinates on the image (hereinafter referred to as a post-correction image), on which the geometric correction has been performed, with respect to representative points of the image (hereinafter referred to as a pre-correction image), on which the geometric correction has not been performed, and associating the coordinates of the representative points on the pre-correction image and the coordinates of the representative points on the post-correction image with each other.

It should be noted that the case of performing the keystone distortion correction as an example of the geometric correction process will hereinafter be described. The coordinate conversion information is calculated by the control section 30 of the projector 1, and is registered in the transmission destination coordinate table 262.

Figures 9A, 9B:
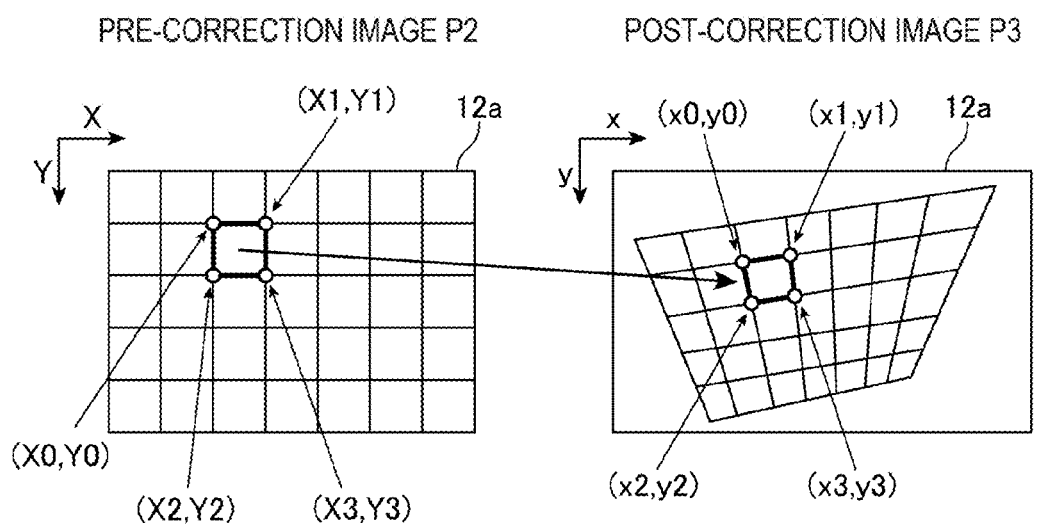

FIGS. 9A and 9B are explanatory diagrams of the calculation method of the coordinate conversion information, wherein FIG. 9A shows the pre-correction image P2 drawn in a pixel area 12a of the liquid crystal panel provided to the light modulation device 12, and FIG. 9B shows the post-correction image P3 drawn in the pixel area 12a.

In the present embodiment, as shown in FIG. 9A, the pre-correction image P2 is divided into rectangular blocks each formed of LXL (L is an arbitrary natural number) pixels, and the grid points of each of the blocks obtained by the division are defined as the representative points described above. The coordinates on the post-correction image P3 are calculated with respect to the grid points of each of the blocks obtained by the division, and the coordinate on the pre-correction image P2 and the coordinate on the post-correction image P3 are registered in the transmission destination coordinate table 262 so as to be associated with each other. It should be noted that a Cartesian coordinate system set in the pre-correction image P2 is defined as an X-Y coordinate system, and a Cartesian coordinate system set in the post-correction image P3 is defined as an x-y coordinate system.

For example, the coordinates of the grid points (X0, Y0), (X1, Y1), (X2, Y2), and (X3, Y3) of the block on the pre-correction image P2 shown in FIG. 9A and the coordinates of the grid points (x0, y0), (x1, y1), (x2, y2), and (x3, y3) of the block on the post-correction image P3 shown in FIG. 9B are respectively associated with each other.

The coordinate calculation section 263 calculates the coordinate of the output pixel on the pre-correction image P2, the pixel value of which can be calculated, from the image data D1 of a plurality of lines stored in the line buffers 261. The coordinate calculation section 263 converts the coordinate of the output pixel thus calculated into the coordinate on the pre-correction image P2, and then notifies the interpolation section 264 of the result. The interpolation section 264 calculates the pixel value of the coordinate on the pre-correction image P2, of which the coordinate calculation section 263 has notified the interpolation section 264, based on the pixel value of the pixel having been read from the line buffers 261. Therefore, in the present embodiment, it is possible to reduce the number of pixels used by the interpolation section 264 in the interpolation process to thereby reduce the increase in band load of the bus connecting the line buffers 261 and the interpolation section 264 to each other.

Each of the sections constituting the coordinate calculation section 263 will be described. The first conversion section 2631 converts the coordinates of the pixels constituting the pre-correction image P2 into the coordinates on the post-correction image P3. The pixels constituting the pre-correction image P2 are each disposed at a position where the coordinate values are integers on the pre-correction image P2, and no pixel exists at a position where a decimal point is included in either of the coordinate values on the pre-correction image P2. Further, there is included the case in which a "coordinate" on the post-correction image P3 has a coordinate value including a decimal point. The selection section 2632 selects the output pixels constituting the post-correction image P3 based on the coordinates on the post-correction image P3 of the pixels constituting the pre-correction image P2. The second conversion section 2633 calculates the coordinates on the pre-correction image P2 of the output pixels selected by the selection section 2632.

The processing of the first conversion section 2631, the selection section 2632, and the second conversion section 2633 will hereinafter be described in detail.

Figure 10:
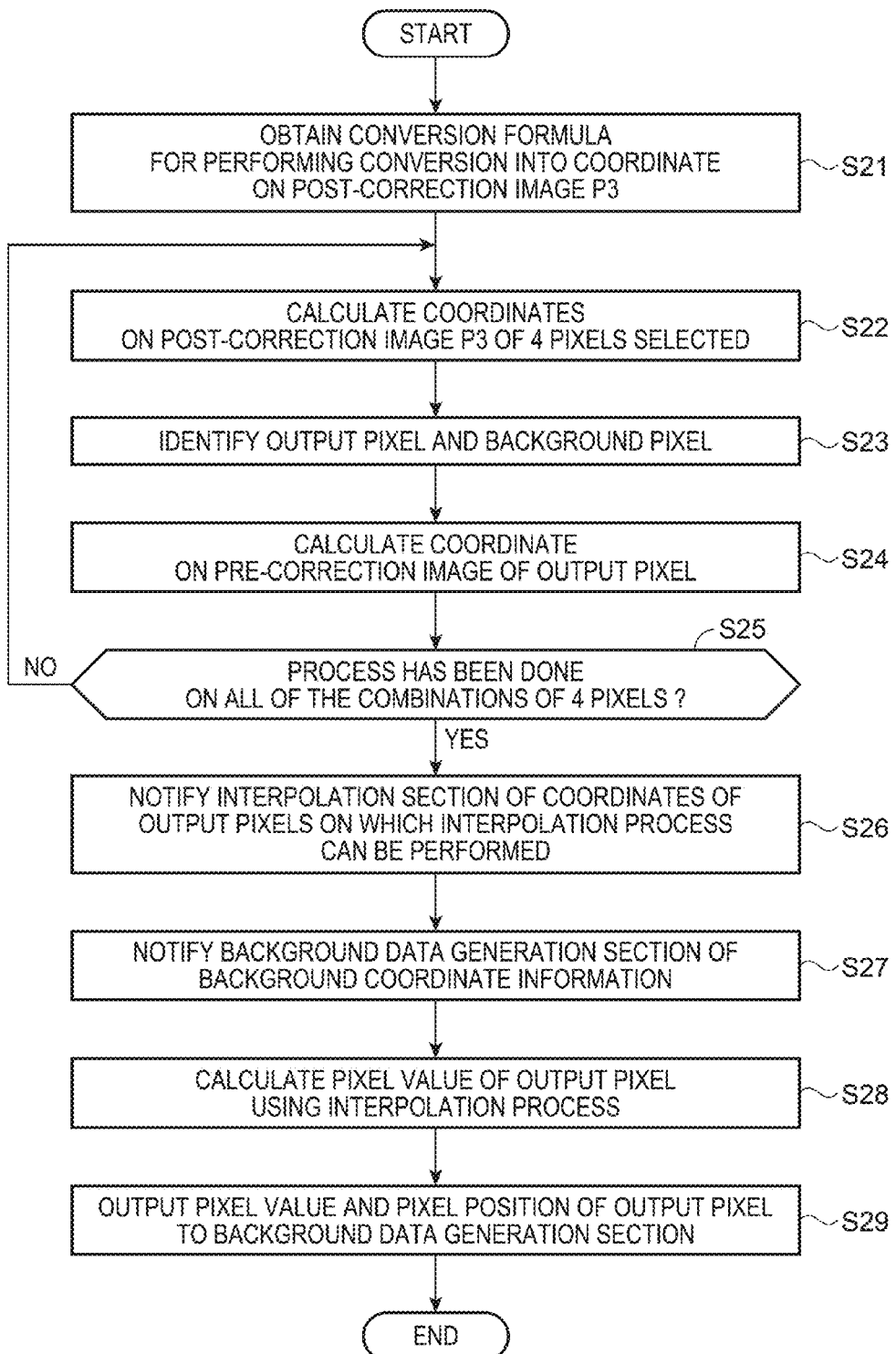
FIG. 10 is a flowchart showing a processing procedure of an image processing section of the second embodiment.

FIG. 10 is a flowchart showing a processing procedure of the geometric correction section 26 of the second embodiment.

Firstly, the first conversion section 2631 looks up the transmission destination coordinate table 262 to obtain (step S21) a conversion formula of linear transformation for converting the coordinate (X, Y) on the pre-correction image P2 into the coordinate (x, y) on the post-correction image P3.

FIGS. 11A and 11B are explanatory diagrams of the geometric correction, wherein FIG. 11A shows an enlarged view obtained by enlarging the block A, which is one of the blocks constituting the pre-correction image P2, and FIG. 11B shows an enlarged view of the block A on the post-correction image P3. By performing the correction, the block A on the pre-correction image P2 is corrected into the block A on the post-correction image P3. Further, a bunch of LXL (L is an arbitrary natural number) pixels is described as a block. Formulas (1) and (2) are the conversion formulas for converting the coordinate (X, Y) in the block A shown in FIG. 11A into the coordinate (x, y) on which the correction has been performed.

$$x = \frac{X(L-Y)x1' + Y(L-Y)x2' + XYx3'}{L^2} + x0 \quad (1)$$

$$y = \frac{X(L-Y)y1' + Y(L-Y)y2' + XYy3'}{L^2} + y0 \quad (2)$$

In order to simplify Formulas (1) and (2), there are substituted x1'=x1-x0, x2'=x2-x0, x3'=x3-x0, y1'=y1-y0, y2'=y2-y0, and y3'=y3-y0.

Further, the coordinate (X, Y) is a coordinate having the upper left point of the block A as the origin. In other words, the coordinate values from the origin (0, 0) of the pre-correction image P0 to the coordinate (X, Y) can be obtained by adding the distance from the origin to the grid point located at the upper left of the block A to the coordinate (X, Y). The coordinate (x, y) on the post-correction image P3 is a coordinate having the origin (0, 0) of the post-correction image P3 as the origin.

FIGS. 12A and 12B are explanatory diagrams of the geometric correction, wherein FIG. 12A shows four pixels selected in the block A shown in FIG. 11A, and FIG. 12B is a diagram showing the pixel positions of the four pixels selected on which the geometric correction has been performed.

Then, the selection section 2632 selects the four pixels (e.g., 2×2 pixels) of a small area in the block in the pre-correction image P2, and then calculates (step S22) the coordinate on the post-correction image P3 of each of the four pixels thus selected using Formulas (1), (2) described above. The four pixels thus selected are hereinafter referred to as pixels a, b, c, and d. FIG. 12A shows the four pixels a, b, c, and d selected on the pre-correction image P2. FIG. 12B shows the positions on the post-correction image P3 of the four pixels a, b, c, and d thus selected. Further, FIG. 12B shows the four pixels a, b, c, and d and pixels (hereinafter referred to as integer pixels) each having the coordinate values expressed by integers and located around the four pixels a, b, c, and d in an enlarged manner.

Then, the selection section 2632 identifies (step S23) an output pixel and a background pixel. The selection section 2632 identifies the integer pixel, which is located in a range surrounded by the four pixels a, b, c, and d on the post-correction image P3, as the output pixel. The pixel F surrounded by the four pixels a, b, c, and d shown in FIG. 12B becomes the output pixel F. Further, in the case in which there exists the integer pixel not surrounded by the four pixels a, b, c, and d on the post-correction image P3, the selection section 2632 identifies the integer pixel as the background pixel included in the background area. The selection section 2632 generates the background coordinate information (the position information) representing the coordinate (the pixel position) of the integer pixel on the post-correction image P3 categorized as the background pixel.

Figure 13A:
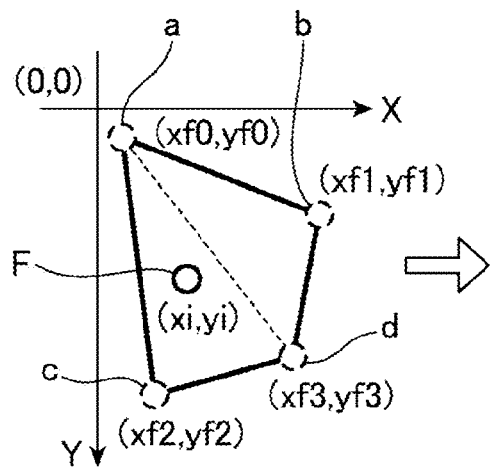
Figure 13B:
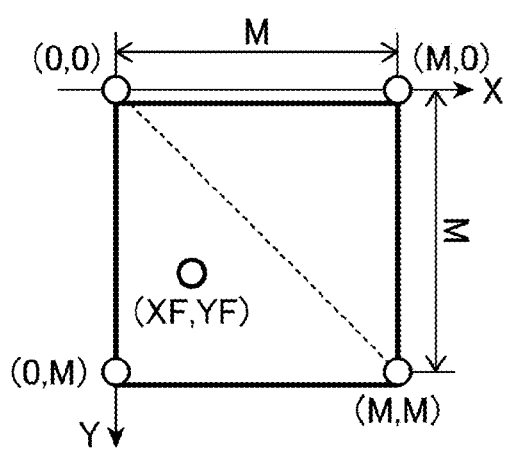

FIGS. 13A and 13B are explanatory diagrams of the geometric correction process, wherein FIG. 13A is a diagram showing the output pixel surrounded by the four pixels on the post-correction image P3, and FIG. 13B is a diagram showing the state in which the four pixels and the output pixel are restored to the state in which the correction has not been performed.

Then, the second conversion section 2633 calculates (step S24) the coordinate on the pre-correction image P2 of the output pixel F. The coordinates on the post-correction image P3 of the four pixels a, b, c, and d selected in the step S22 are described as a (xf0, yf0), b (xf1, yf1), c (xf2, yf2), and d (xf3, yf3) as shown in FIG. 13A. Further, the coordinate of the output pixel F identified in the step S23 is described as (xi, yi) as shown in FIG. 13A.

The second conversion section 2633 firstly determines whether the output pixel F is included in a triangular range surrounded by the pixels a (xf0, yf0), c (xf2, yf2), and d (xf3, yf3) out of the four pixels a, b, c, and d, or included in a triangular range surrounded by the pixels a (xf0, yf0), b (xf1, yf1), and d (xf3, yf3).

In the case in which the second conversion section 2633 determines that the output pixel F is included in the triangular range surrounded by the pixels a (xf0, yf0), c (xf2, yf2), and d (xf3, yf3), the second conversion section 2633 calculates the coordinate (XF, YF) on the pre-correction image P2 of the output pixel F (xi, yi) using Formulas (3), (4) described below. FIG. 13B shows the coordinate (XF, YF) on the pre-correction image P2 of the output pixel F (xi, yi). Formulas (3) and (4) are formulas obtained by obtaining a conversion formula of an affine transformation for restoring the coordinates on the post-correction image P3 of the four pixels a, b, c, and d to the coordinates on the pre-correction image P2, and then converting the output pixel F (xi, yi) into the coordinate (XF, YF) on the pre-correction image P2 using the conversion formula thus obtained. Further, the value of a character M shown in Formulas (3) and (4) is a value corresponding to a distance between the pixels, and in the case of assuming the coordinates of the 2×2 pixels adjacent on upper, lower, right, and left sides, the value of M becomes 1.

$$XF = M(yf2 \cdot xi - xf2 \cdot yi)/(xf3 \cdot yf2 - xf2 \cdot yf3) \quad (3)$$

$$YF = M(xf3 \cdot yi - yf3 \cdot xi)/(xf3 \cdot yf2 - xf2 \cdot yf3) \quad (4)$$

Further, in the case in which the output pixel F is included in the triangular range surrounded by the pixels a (xf0, yf0), b (xf1, yf1), and d (xf3, yf3), the coordinate calculation section 263 obtains the conversion formula for calculating the coordinate (XF, YF) on the pre-correction image P2 of the output pixel F (xi, yi) using Formulas (5), (6) described below. Formulas (5) and (6) are formulas obtained by obtaining a conversion formula of an affine transformation for restoring the coordinates on the post-correction image P3 of the four pixels a, b, c, and d to the coordinates on the pre-correction image P2, and then converting the output pixel F (xi, yi) into the coordinate (XF, YF) on the pre-correction image P2 using the conversion formula thus obtained. Further, the value of the character M shown in Formulas (5) and (6) is a value corresponding to a distance between the pixels, and in the case of assuming the coordinates of the 2×2 pixels adjacent on upper, lower, right, and left sides, the value of M becomes 1.

$$XF = M(yf3 \cdot xi - xf3 \cdot yi)/(xf1 \cdot yf3 - xf3 \cdot yf1) \quad (5)$$

$$YF = M(xf1 \cdot yi - yf1 \cdot xi)/(xf1 \cdot yf3 - xf3 \cdot yf1) \quad (6)$$

Further, in the case in which there exist two or more output pixels surrounded by the coordinates on the post-correction image P3 of the four pixels a, b, c, and d, the coordinate calculation section 263 calculates the coordinate (XF, YF) on the pre-correction image P2 with respect to each of the output pixels.

It should be noted that in the present embodiment, the affine transformation is used instead of the linear transformation when calculating the coordinate on the pre-correction image P2 of the output pixel F. This is because the calculation for obtaining the inverse function of the conversion formula of the linear transformation is complicated, and therefore, the coordinate on the pre-correction image P2 of the output pixel F is calculated using the affine transformation.

Then, the coordinate calculation section 263 determines (step S25) whether or not the process of the steps S22 through S24 described above has been performed in all of the combinations of the four pixels included in the pre-correction image P2. In the case of the negative determination (NO in the step S25), the coordinate calculation section 263 returns to the process of the step S22, and performs the process of the steps S22 through S24 with respect to one of other combinations of the four pixels not having been selected.

Further, the coordinate calculation section 263 performs the process of the steps S22 through S24 described above in all of the combinations of the four pixels included in the pre-correction image P2 to generate the background coordinate information. Further, it is also possible for the coordinate calculation section 263 to identify the pixel located on the boundary between the background pixel and the pixel in the image area when generating the background coordinate information to thereby simplify the generation of the background coordinate information. For example, in the case in which the pixel located below the pixel categorized as the background pixel is the pixel in the image area in the same line in the horizontal direction, the coordinate calculation section 263 categorizes all of the pixels located on the upper side of the background pixel as the background pixel.

In the case in which the determination in the step S25 is a positive determination (YES in the step S25), the coordinate calculation section 263 notifies the interpolation section 264 of the coordinate (XF, YF) of the output pixel F. The coordinate calculation section 263 notifies (step S26) the interpolation section 264 of the coordinate (XF, YF) of the output pixel F on which the interpolation process can be performed based on the image data D1 stored in the line buffers 261 out of the coordinates (XF, YF) of the output pixels F on the pre-correction image P2 calculated in the step S24. For example, in the case in which the interpolation process by the interpolation section 264 is the interpolation process using the 4 tap filter, 4×4 pixels of the image data D1 become necessary. Therefore, the coordinate calculation section 263 selects the output pixel F, and then notifies the interpolation section 264 of the output pixel F, wherein the pixel data of the 4×4 pixels located around the selected output pixel F is stored in the line buffers 261.

Further, the coordinate calculation section 263 notifies (step S27) the background data generation section 28 of the background coordinate information thus calculated.

In the filter table 265, there are registered a filter coefficient in the X-axis direction and a filter coefficient in the Y-axis direction used by the interpolation section 264 in the interpolation process. The filter coefficients are the coefficients for obtaining the pixel value by the interpolation process with respect to the pixel, for which corresponding one of the pixels of the pre-correction image P2 cannot be identified, among the output pixels constituting the post-correction image P3. For example, in the filter table 265, there are registered the filter coefficients of vertically/horizontally separated one-dimensional filters.

The interpolation section 264 calculates (step S28) the pixel values in the coordinate on the pre-correction image P2 of the output pixel F (XF, YF) having been notified of by the coordinate calculation section 263 using the interpolation calculation. In the case in which, for example, the tap number of the interpolation filter used by the interpolation section 264 in the interpolation calculation is 4, the interpolation section 264 uses the 4×4 pixels located in the periphery of the output pixel F (XF, YF) in the interpolation process. Further, the interpolation section 264 selects the filter coefficient of the interpolation filter based on the distance (dX, dY) between the output pixel F (XF, YF) and the integer pixel closest to the output pixel F. The interpolation section 264 performs a convolution operation of the pixel value of the pixel thus selected and the filter coefficient of the interpolation filter thus selected to calculate the pixel value of the output pixel F (XF, YF). When the interpolation section 264 calculates the pixel value, the interpolation section 264 outputs (step S29) the pixel value of the output pixel F (XF, YF) thus calculated to the background data generation section 28.

The background data generation section 28 writes the background data or the image data to the frame memory 27 based on the background coordinate information obtained from the coordinate calculation section 263. In the processing procedure of the background data generation section 28 in this case, only the information referred to by the background data generation section 28 is changed from the background map explained in the description of the first embodiment to the background coordinate information, and therefore the explanation will be omitted.

As described hereinabove, the projector 1 according to the embodiment to which the invention is applied is an image processing device for performing the geometric correction on the input image to generate the output image, and is provided with the geometric correction section 26 and the background data generation section 28. The geometric correction section 26 performs the geometric correction of the input image. In the case in which the data of the post-correction image obtained by performing the geometric correction on the input image is input from the geometric correction section 26, the background data generation section 28 outputs the data of the post-correction image as the data of the output image, and in the case in which the data of the post-correction image is not input from the geometric correction section 26, the background data generation section 28 outputs the data of the background image to be the background of the post-correction image as the data of the output image. Therefore, the degradation of the display image quality of the image due to the geometric correction can be suppressed.

Further, the projector 1 is provided with the coordinate calculation section 263 for generating the position information representing the pixel position of the output image where the data of the post-correction image is not output from the geometric correction section 26. The background data generation section 28 determines the timing at which the data of the post-correction image is not input from the geometric correction section 26 based on the position information, and then outputs the data of the background image at the timing at which the data of the post-correction image is not input. Therefore, it is possible to accurately determine the timing at which the data of the post-correction image is not input from the geometric correction section 26 to output the data of the background image as the output image.

Further, the background map generation section 251 generates the background information representing the background of the post-correction image as the position information based on the data of the post-correction image input from the geometric correction section 26 when the geometric correction section 26 performs the geometric correction on one frame of the input image. Therefore, the position information can be generated with a simple process.

It should be noted that the embodiments described above are nothing more than examples of a specific aspect to which the invention is applied, and therefore, do not limit the invention. Therefore, it is also possible to apply the invention as an aspect different from the embodiments described above. Although in the embodiments, the explanation is presented showing the example of performing the keystone distortion correction (keystone correction) as an example of the geometric correction, the invention is not limited to this example, but can also be applied to the case of performing a barrel distortion correction (a pin-cushion distortion correction), and can also be applied to the geometric correction of deforming the image to have a more complicated shape.

Further, although in the embodiments described above, the explanation is presented citing the configuration, in which the three transmissive liquid crystal panels corresponding respectively to the colors of R, G, and B are used as the light modulation device 12 for modulating the light emitted by the light source, as an example, the invention is not limited to this example. For example, it is also possible to adopt a configuration of using three reflective liquid crystal panels, or to use a system having a liquid crystal panel and a color wheel combined with each other. Alternatively, the invention can be constituted by a system using three digital mirror devices (DMD), a DMD system having a single digital mirror device and a color wheel combined with each other, or the like. In the case of using just one liquid crystal panel or DMD as the light modulation device, the member corresponding to the combining optical system such as the cross dichroic prism is unnecessary. Further, besides the liquid crystal panel or the DMD, any light modulation device capable of modulating the light emitted by the light source can be adopted without problems.

Further, although in the embodiments described above, there is described the front projection type projector 1 for performing the projection from the front of the screen SC as a device implementing the image processing device, the invention is not limited to this configuration. For example, a rear projection type projector for performing the projection from the backside of the screen SC can be adopted as the display device. Further, a liquid crystal display, an organic electroluminescence (EL) display, a plasma display, a cathode-ray tube (CRT) display, a surface-conduction electron-emitter display (SED), and so on can be used as the display device.

Further, each of the functional sections shown in FIGS. 1, 2, and 8 is for showing the functional configuration, and the specific implementation configuration is not particularly limited. In other words, it is not necessarily required to install the hardware corresponding individually to each of the functional sections, but it is obviously possible to adopt the configuration of realizing the functions of the plurality of functional sections by a single processor executing a program. Further, apart of the function realized by software in the embodiments described above can also be realized by hardware, or a part of the function realized by hardware can also be realized by software. Besides the above, the specific detailed configuration of each of other sections of the projector 1 can arbitrarily be modified within the scope or the spirit of the invention.

What is claimed is:

1. An image processing device adapted to deform an input image to generate an output image, comprising:
   at least one processor configured to:
      perform deformation of the input image to generate a post-deformation image;
      generate position information representing a pixel position of the output image where the data of the post-deformation image is not input;
      determine a timing at which the data of the post-deformation image is not input based on the position information; and
      output data of the post-deformation image as data of the output image in a case in which the data of the post-deformation image is input, and output data of a background image to be a background of the post-deformation image as the data of the output image at the timing at which the data of the post-deformation image is not input.

2. The image processing device according to claim 1, wherein the at least one processor is further configured to:
generate background information representing the background of the post-deformation image as the position information based on the data of the post-deformation image when one frame of the input image is deformed.

3. A display device adapted to deform an input image to generate an output image to be displayed on a display section, comprising:
at least one processor configured to:
perform deformation of the input image to generate a post-deformation image;
generate position information representing a pixel position of the output image where the data of the post-deformation image is not input;
determine a timing at which the data of the post-deformation image is not input based on the position information;
output data of the post-deformation image as data of the output image in a case in which the data of the post-deformation image is input, and output data of a background image to be a background of the post-deformation image as the data of the output image at the timing at which the data of the post-deformation image is not input; and
form the output image to be displayed on the display section based on the data of the output image.

4. A method of controlling an image processing device adapted to deform an input image to generate an output image, the method comprising:
performing deformation of the input image to generate a post-deformation image;
generating position information representing a pixel position of the output image where the data of the post-deformation image is not input;
determining a timing at which the data of the post-deformation image is not input based on the position information; and
outputting data of the post-deformation image as data of the output image in a case in which the data of the post-deformation image is input, and outputting data of a background image to be a background of the post-deformation image as the data of the output image at the timing at which the data of the post-deformation image is not input.

* * * * *